Patented Jan. 22, 1929.

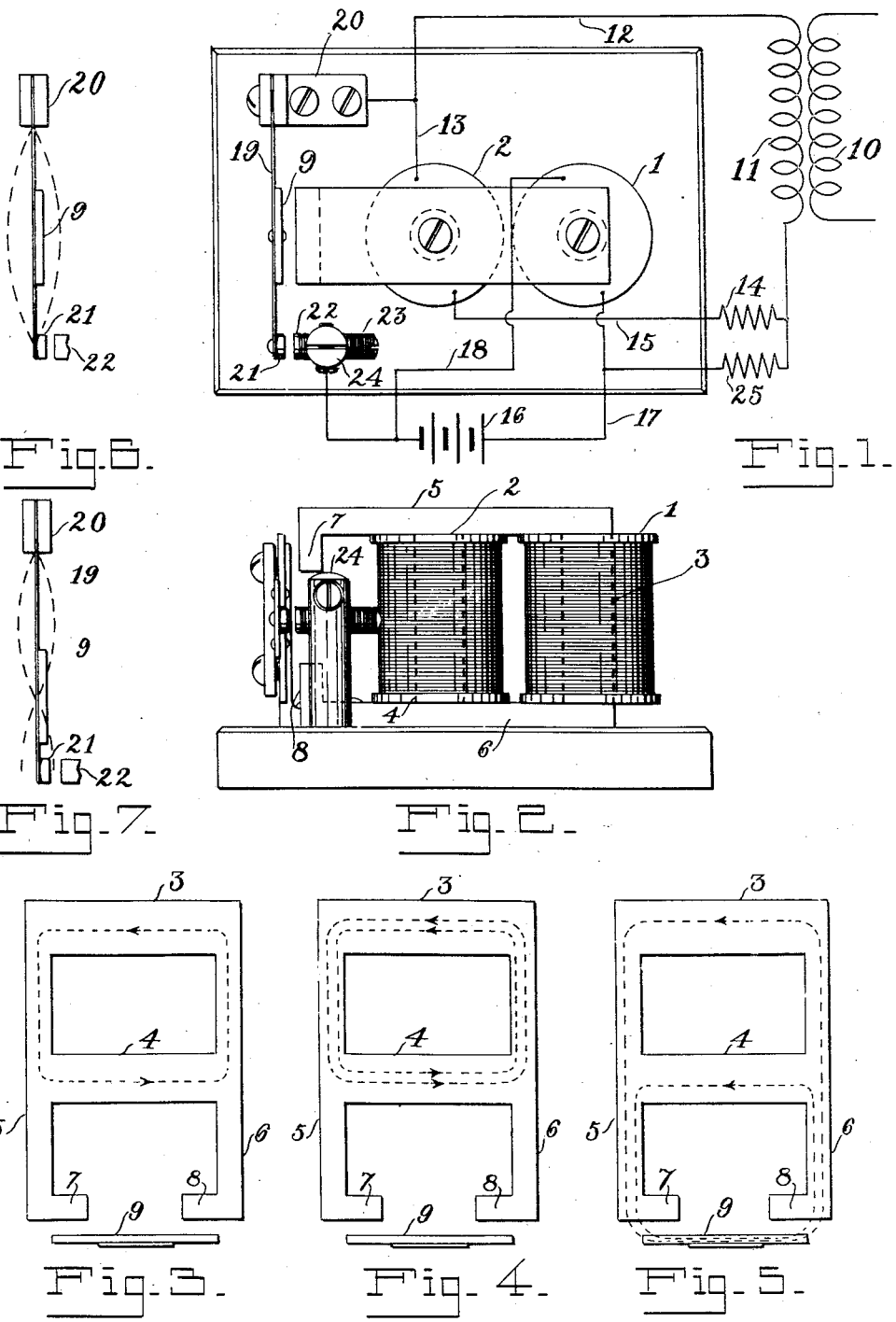

1,699,602

UNITED STATES PATENT OFFICE.

EDWIN C. BALLMAN, OF ST. LOUIS, MISSOURI.

RECTIFIER FOR ALTERNATING CURRENTS.

Application filed February 10, 1923. Serial No. 618,258.

This invention relates to rectifiers for alternating currents, and more particularly to rectifiers intended for use in charging storage batteries and the like.

In charging a storage battery from an alternating current supply, it is necessary that the rectifier be capable of supplying to the battery a current of definite polarity and it should also be capable of positively maintaining correct polarity throughout the charge. This is necessary for the reason that if the incorrect polarity were impressed upon the battery, the same would be discharged instead of charged.

Numerous attempts have been made to provide a rectifier which will establish a definite polarity. In practically all of those which have attained successful operation, a permanent magnet is used to determine what the polarity shall be. With such a device it is usually necessary to connect the battery to the rectifier with due regard to the polarities of both the rectifier and the battery.

One of the objects of this invention is to provide a rectifier which shall present and maintain a definite polarity so as to supply charging current to the battery in the proper direction.

Another object of this invention is to provide such a rectifier with a determinate polarity without the necessity of employing a permanent magnet to fix the polarity thereof.

Another object of this invention is to provide such a rectifier which may be connected to the battery irrespective of the polarity thereof and by means of which the battery itself will determine the correct polarity for the rectifier.

Another object of this invention is to improve the construction of the rectifier, particularly with reference to the vibrating armature so as to improve the performance thereof by reducing the sparking at the contacts.

Further objects will appear from the detail description taken in connection with the accompanying drawing, in which:

Figure 1 is a plan view of a rectifier embodying this invention and showing the circuit connections;

Figure 2 is a view in elevation;

Figures 3, 4 and 5 are diagrammatic views of the magnetic circuit illustrating the action of the rectifier; and Figures 6 and 7 are details of the vibrating armature.

The rectifier of this invention comprises a pair of windings 1 and 2. These are not necessarily alike but are intended for different circuits, the coil 1 being excited from the direct current or battery circuit and the coil 2 being excited from the alternating current circuit. These coils are provided with soft iron cores 3 and 4 respectively which are joined at their ends by yokes 5 and 6. The entire magnetic circuit may be of soft iron and may be built up of laminations in a manner similar to that of the well known transformer core. The yokes 5 and 6 extend beyond the core 4 and are provided with off-set end portions adapted to provide pole pieces 7 and 8. The form of the magnetic circuit is such as to provide a main path for the flux of the coil 1 comprising the cores 3 and 4 and that portion of the yokes lying between said cores. A shunt path is also provided comprising the core 3, the yokes including the pole pieces 7 and 8 and the vibrating armature 9 which is resiliently suspended so as to be capable of vibration while lying in the shunt path as will be described later.

Connections to the supply circuit are made as shown in Figure 1. In this figure 10 represents the primary coil of a transformer which is connected to an alternating current supply circuit, not shown. The secondary coil 11 of this transformer is connected by the conductors 12 and 13 to one side of the coil 2 and through a resistance 14 and conductor 15 to the other side of the coil 2. The coil 2 will, therefore, be excited by an alternating current of suitable voltage supplied by the coil 11. The battery 16 which is to be charged is connected by conductors 17 and 18 to opposite sides of the coil 1. This coil is thus excited by direct current from the battery.

It will be evident that as soon as the battery 16 is connected to the coil 1 as described above, a magnetic flux will be set up in the magnetic circuit as indicated by the dotted lines in Figure 3. This flux is set up in the main magnetic path comprising the cores 3 and 4 and the portion of the yokes 5 and 6 lying between said cores. For the sake of illustration, the direction of this flux may be taken as that indicated by the arrow point in Figure 3. When only the coil 1 is excited, the greater part of the magnetic flux will be confined to the main magnetic path pointed out above. Since, however, there is also a shunt path available as pointed out above, a small portion of the flux may traverse this path. The shunt path has a much greater reluctance than the main path on account of the fact that it has air gaps, while the main path consists of a continuous circuit of soft iron. Consequently the flux which traverses the shunt path under the conditions assumed in Figure 3 will be comparatively quite small and can, therefore, be disregarded in this discussion.

The coil 2, wound upon the core 4, is excited by an alternating current. The magnetic flux which it will tend to set up may, therefore, flow in either of two directions through that core. In Figure 4 it has been assumed that, for the instant under consideration, the flux set up by the coil 2 flows in the same direction through the core 4 as that set up by the coil 1. These fluxes are represented in Figure 4 by the two dotted lines traversing the main magnetic path, each line representing the flux set up by one winding. The arrow heads on the dotted lines indicate the coincident directions of the two fluxes. Under these conditions there will be an increased flux traversing the main magnetic path since the magnetomotive force impressed upon that path is represented by the sum of the magnetomotive forces of the individual windings. In this case also the flux traversing the shunt path, some times called leakage flux, may be disregarded.

At a certain time after the instant represented by Figure 4 the current in the coil 2 will have reversed in accordance with the reversal of the alternating current therethrough. When the current has reversed, the tendency of the winding 2 will be to set up a flux in the core 4 in a direction opposite to that indicated in Figure 4. The flux so set up will not, however, traverse the main magnetic path since it would encounter the opposition of the flux set up by the coil 1 which is constant in direction. Since the flux set up by the coil 2 is thus prevented from traversing the main magnetic path, it will be forced to traverse the shunt path through the extended arms of the yokes 5 and 6 and the armature 9. At the same time the flux set up by the coil 1, which we may call the direct flux to distinguish it from the alternating flux of coil 2, will, in attempting to traverse the core 4 in the original direction, be met by the opposition of the flux now set up by the coil 2. The direct flux will thus be unable to traverse the yoke 4 and will, therefore, also be forced to take the shunt path through the armature 9. This condition is illustrated in Figure 5 in which the dotted line through the core 3 represents the direct flux and the dotted line through the core 4 represents the alternating flux. It will be noted that both of these fluxes now traverse the armature 9 so that this armature will be strongly attracted to the pole pieces 7 and 8.

As the alternating current in the coil 2 undergoes rapid reversals, the magnetic conditions will change rapidly from that of Figure 4 to that of Figure 5 and back, these changes taking place in synchronism with the current alternations in coil 2. Since the flux through the armature 9 is practically negligible under the conditions of Figure 4 and is very strong under the conditions of Figure 5, this armature which is mounted for vibration will be forced to vibrate rapidly in synchronism with the variations of the flux therethrough and, therefore, in synchronism with the current alternations in the coil 2.

The armature 9 may be suspended by means of its spring 19 from a rigid support 20 to which the spring 19 is clamped. This suspension allows the armature to vibrate freely before the pole pieces 7 and 8. The end of the spring 19 carries a contact 21 adapted to engage a similar contact 22 when the armature is attracted to the pole pieces 7 and 8. The contact 22 is mounted upon the end of the screw 23 threaded into a standard 24 so as to render the contact 22 adjustable with respect to the contact 21.

The support 20 may be connected through the conductors 13 and 12 to the secondary coil 11 of the transformer. The standard 24 may be connected to one pole of the battery 16 as indicated in Figure 1. The other pole may then be connected through conductors 17 and a resistance 25 to the opposite side of the coil 11 from that to which the support 20 is connected. A circuit is thus established from one side of the coil 11 through the conductor 12 to the support 20, through the spring 19, contacts 21 and 22 when closed, the standard 24, through the battery 16, the conductor 17, resistance 25 and back to the coil 11. When the contacts 21 and 22 are closed, the current will flow through this circuit and the relative polarity of the coils 1 and 2 may be so adjusted that the direction of this current is such as to charge the battery. It will be evident, therefore, that so long as the coil 2 is excited with alternating current, the armature 9 will vibrate so as to vibrate the contact 21. With the polarity of the coils 1 and 2 properly related, the contacts 21 and 22 will be closed every time the polarity of the coil 11 is such as to send a charging current through the battery 16. The coil 1 being excited from the battery 16 itself, its polarity will remain constant and, therefore, the polarity of the coil 11 at which the contacts 21 and 22 are closed is also maintained constant and in such a direction as to send a charging current into the battery.

The armature 9 together with its spring 19 and contact 21 form what may be termed a switching armature adapted to vibrate in the shunt magnetic path and in synchronism with the current alternations in the coil 2. In order that this switching armature shall vibrate freely in synchronism with said current alternations, its natural period of vibration should be adjusted so as to coincide approximately with the period of the alternating current. This may be done by adjusting the weight of the soft iron armature 9 and the strength of the spring 19. The switching armature should also be adjusted to vibrate with a free or fundamental vibration of its own. That is to say, the presence of internal harmonic vibrations within the armature itself should be avoided. The manner or mode of vibration of the armature depends upon the distribution of weight or loading thereof. With an armature loaded as indicated in Figure 7 where the weight of the soft iron armature 9 is placed near the contact 21, which may itself have appreciable weight, the distance between the support 20 and the load 9 is greater than the distance between the load 9 and the contact 21. As a result of this distribution of weight the center of oscillation or center of percussion is at different distances from the support 20 and the contact 22 which forms an abutment against which the contact 21 strikes. If the contact 22 were removed the armature would have a certain period of vibration about the pivot 20, said period being determined to some extent by the location of the load 9. At the instant that the contact 21 strikes the contact 22, there is a tendency for the armature to take up an additional oscillation about the contact 22 as a pivot. Since the load 9 is located close to the contact 21, the period of such additional vibration would naturally be different than the main period when vibrating freely about the pivot 20. The impact with the abutment 22, therefore, may tend to impress upon the armature a secondary vibration of a different period from that under which it is already moving and this is superimposed upon the primary vibration. The result of this is to send a tremor or harmonic vibration through the spring 19 tending to make it vibrate somewhat as indicated by the dotted lines in Figure 7. This tremor is internal to the armature itself and more or less independent of its swing about the pivot 20 and may be of any period and considerable violence and will have a tendency to make the contact 21 dance upon the contact 22 during the minute interval during which the contact takes place. The result of such dancing is that the resistance of contact is greatly increased and considerable sparking and consequent corrosion of the contacts is produced. With the armature loaded as indicated in Figure 6, where the load 9 is placed substantially mid-way between the pivot 20 and the abutment 22, or so that the weight is more or less concentrated at the center of percussion, the engagement of the contacts will tend to impress upon the armature a vibration of substantially the same period as that of its natural oscillation and free from internal harmonics. Since this period is not substantially different from that under which the armature is already moving, no new vibration will be impressed and the armature will continue under its natural period. Thus the contacts 21 and 22 will remain in close contact throughout their contacting interval and while the spring is bowed under the inertia of the load 9 preparatory to springing back for a new oscillation. The oscillation is, therefore, smooth and without harmonic vibrations so that sparking is reduced and also the resistance of the contacts. This action is illustrated by the broken lines in Figure 6. When the weight of the moving contact is considerable the center of percussion is shifted from the mid-position and this loading must be altered accordingly.

It will be seen, therefore, that in accordance with this invention a rectifier is provided by means of which a battery may be charged in a definite and determined direction. The arrangement is such that the polarity of the charging current is maintained constant throughout the charge and determined by the polarity of the battery itself. This is accomplished by insuring such a relation between the fluxes set up by the direct current coil and the alternating current coil that in one direction substantially all of the flux will be confined to the main magnetic path and with the other direction of alternating current substantially the entire flux will be deflected to the shunt path through the armature so as to attract the same to close the charging circuit. A further advantage of this construction is that the polarity of the rectifier is less dependent upon the condition of the charge of the battery than with previous types of rectifiers. The direct-current winding contributes only one-half, approximately, of the flux which is effective in attracting the armature, so that any variation of the battery voltage will be reduced by one-half, or more, in its effect upon the attracting force. The liability of having a weak battery reversed by the rectifier is thus reduced.

A rectifier is provided which will have increased life and greater uniformity of adjustment on account of reduction of sparking at the contacts due to proper loading of the armature so as to prevent harmonic vibrations thereof. Thus the contact resistance is reduced and the energy lost thereby is saved so that the efficiency of the rectifier is, therefore, increased.

It is obvious that various changes may be made in details of construction without departing from the spirit of this invention; it is, therefore, to be understood that this invention is not to be limited to the specific details shown and described.

Having thus described the invention, what is claimed is:

1. A rectifier for alternating currents comprising a magnet core having a main magnetic path and having an extension integral therewith in the plane of said path, said extension being adapted to provide a shunt magnetic path in said plane, a winding adapted to set up a magnetic flux in said main path, means for setting up a flux in said shunt path adapted to deflect said first flux to said shunt path, and an unpolarized switching armature adapted to vibrate in said shunt path.

2. A rectifier for alternating currents comprising a magnetic core having a main magnetic path, and having an extension integral with said core in the plane of said path, said extension being adapted to provide a shunt magnetic path in said plane, a winding adapted to set up a magnetic flux in said main path, means for setting up an alternating flux in said shunt path adapted to periodically deflect said first flux to said shunt path, and an unpolarized switching armature adapted to vibrate in said shunt path.

3. A rectifier for alternating current, comprising a pair of magnet cores having a common main magnetic path, and having extensions in the plane of said path adapted to provide a shunt magnetic path, a pair of windings each adapted to set up a magnetic flux in said common main path, means for setting up flux in said shunt path adapted to deflect said first flux to said shunt path and an unpolarized switching armature adapted to vibrate in said shunt path.

4. A rectifier for alternating current comprising a pair of magnet cores having a common main magnetic path, and having extensions in the plane of said path adapted to provide a shunt magnetic path, a pair of windings each adapted to set up a magnetic flux in said common main path, means for setting up an alternating flux in said shunt path adapted to periodically deflect said first flux to said shunt path and an unpolarized switching armature adapted to vibrate in said shunt path.

5. A rectifier for alternating current comprising a magnet core, having a main magnetic path and having an extension in the plane of said path adapted to provide a shunt magnetic path, a pair of windings each adapted to set up a magnetic flux in said main path, means for setting up a flux in said shunt path adapted to deflect said first flux to said shunt path and an unpolarized switching armature adapted to vibrate in said shunt path.

6. A rectifier for alternating currents, comprising, a magnetic core, windings on said core adapted to set up a pulsating magnetic flux, and a switching armature constructed to vibrate under the influence of said flux and suspended so as to eliminate internal harmonic vibrations.

7. A rectifier for alternating currents, comprising, a magnetic core, windings on said core adapted to set up a pulsating magnetic flux, and a switching armature constructed to vibrate under the influence of said flux and suspended and loaded so as to eliminate internal harmonic vibrations.

8. A rectifier for alternating currents, comprising, a magnetic core, windings on said core adapted to set up a pulsating magnetic flux, and a switching armature constructed to vibrate under the influence of said flux, said armature being suspended for vibration at one end and loaded intermediate its suspension and its switching contact so as to eliminate internal harmonic vibrations.

9. A rectifier for alternating currents, comprising, a magnetic core, windings on said core adapted to set up a pulsating magnetic flux, and a switching armature constructed to vibrate under the influence of said flux, said armature being suspended for vibration at one end and having a weighted contact at its other end and being loaded substantially at its center of percussion between its suspension and its switching contact so as to eliminate internal harmonic vibrations.

10. A rectifier for alternating currents, comprising, a magnetic core, windings on said core adapted to set up a pulsating magnetic flux, and a switching armature constructed to vibrate under the influence of said flux, said armature being suspended for vibration at one end and loaded adjacent its center of percussion so as to eliminate internal harmonic vibrations.

11. A rectifier for alternating currents, comprising, a magnetic core, windings on said core adapted to set up a pulsating magnetic flux, and a switching armature constructed to vibrate under the influence of said flux, said armature being loaded at a plurality of points with one of said loads at its center of percussion.

12. A rectifier for alternating currents, comprising, a magnetic core, windings on said core adapted to set up a pulsating magnetic flux, and a switching armature constructed to vibrate under the influence of said flux, said armature being loaded at a plurality of points with the greater of said loads at its center of percussion.

13. A rectifier for alternating currents, comprising, a magnetic core, windings on said core adapted to set up a pulsating magnetic flux, a switching armature constructed to vibrate under the influence of said flux, said armature being loaded at a plurality of points with one of said loads at its center of percussion, and a stationary contact engaging said armature at said other load point.

14. In a rectifier for alternating currents having a magnetic core and windings on said core adapted to set up a pulsating magnetic flux, a switching armature constructed and suspended to vibrate under the influence of said flux and synchronously therewith, the loading of said armature being adjusted so as to eliminate internal harmonic vibrations within said armature.

15. In a rectifier for alternating currents having a magnetic core and windings on said core adapted to set up a pulsating magnetic flux, a switching armature constructed and suspended to vibrate under the influence of said flux and synchronously therewith, the loading of said armature being so positioned relatively to its center of percussion as to eliminate internal harmonic vibrations within said armature.

In testimony whereof I affix my signature this 18 day of Jan., 1923.

EDWIN C. BALLMAN.